United States Patent Office 3,793,356
Patented Feb. 19, 1974

3,793,356
DIHYDROCARBYLTIN BIS(HYDROCARBYLOXY HYDROCARBYL MERCAPTIDE)
Ralph P. Williams, Bartlesville, Okla., assignor to Phillips Petroleum Company
No Drawing. Filed Apr. 26, 1972, Ser. No. 247,585
Int. Cl. C07f 7/22
U.S. Cl. 260—429.7   5 Claims

ABSTRACT OF THE DISCLOSURE

Organotin mercaptides having the formula $$R_2Sn(SR'OR'')_2,$$

wherein each R and each R" is individually selected from the group consisting of monovalent hydrocarbon radicals and each R' is individually selected from the group consisting of divalent hydrocarbon radicals. The title compounds are useful stabilizing agents for polymeric materials.

This invention relates to the stabilization of polymeric materials. More particularly, the invention relates to novel organotin derivatives of mercapto compounds. Still more particularly, the invention relates to novel resin compositions having incorporated therein organotin derivatives of mercapto compounds.

The novel hydrocarbyltin mercaptides of the present invention are characterized by the formula

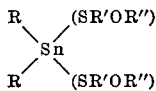

wherein each R is individually selected from the group consisting of monovalent hydrocarbon radicals having from 1 to 8 carbon atoms; each R' is individually selected from the group consisting of divalent hydrocarbon radicals having from 2 to 6 carbon atoms; and each R" is individually selected from the group consisting of monovalent hydrocarbon radicals having from 2 to 20 carbon atoms. More particularly, R is selected from the group consisting of alkyl, cycloalkyl, aryl, and combinations thereof, such as alkaryl, aralkyl, and the like radicals having from 1 to 8 carbon atoms, preferably alkyl radicals having from 2 to 4 carbon atoms; R' is selected from the group consisting of alkylene, cycloalkylene and arylene radicals having from 2 to 6 carbon atoms, preferably alkylene groups having 2 or 3 carbon atoms; and R" is selected from the group consisting of alkyl, cycloalkyl, aryl, and combinations thereof, such as alkaryl, aralkyl, and the like radicals having from 2 to 20 carbon atoms, preferably such radicals having 12 to 18 carbon atoms. Particularly preferred are those hydrocarbyltin derivatives wherein the R groups are the same, the R' groups are the same, and the R" groups are the same. Still more preferred are those compounds wherein R is an alkyl group of 2 to 4 carbon atoms, preferably butyl; R' is an ethylene group; and R" is an alkyl radical having from 12 to 18 carbon atoms.

Representative examples of the dihydrocarbyltin derivatives of the present invention are the following:

dimethyltin bis(2-ethoxyethyl mercaptide),
diethyltin bis[2-(dodecyloxy)ethyl mercaptide],
dibutyltin bis[3-(octadecyloxy)propyl mercaptide],
diisobutyltin bis[2-(octadecyloxy)ethyl mercaptide],
dioctyltin bis[6-(eicosyloxy)hexyl mercaptide],
dipropyltin bis[2-methyl-4-(3-methylpentyloxy)butyl mercaptide],
dicyclohexyltin bis[4-(cyclopentyloxy)phenyl mercaptide],
diphenyltin bis(3-phenoxycyclopentyl mercaptide),
di-p-tolyltin bis[2-(benzyloxy)ethyl mercaptide],
benzylbutyltin bis[3-(m-tolyloxy)propyl mercaptide],
diisopropyltin 2-isopropoxypropyl mercaptide 4-butoxybutyl mercaptide,
dibutyltin bis[2-(octadecyloxy)ethyl mercaptide], and mixtures thereof.

The novel hydrocarbyltin derivatives of the present invention can be prepared by the reaction of the corresponding mercaptohydrocarbyl hydrocarbyl ether with a dihydrocarbyltin dihalide or a dihydrocarbyltin oxide, in accordance with the following schematic represenation:

$$R_2SnX_2 + HSR'OR'' \rightarrow R_2Sn(SR'OR'')_2$$

or $$R_2SnO + HSR'OR'' \rightarrow R_2Sn(SR'OR'')_2,$$

wherein X is a halogen, and R, R' and R" are as previously defined. Illustrative examples of mercaptohydrocarbyl hydrocarbyl ethers which can be used to make the novel hydrocarbyltin derivatives of this invention include:

2-mercaptoethyl ethyl ether,
2-mercaptoethyl dodecyl ether,
2-mercaptoethyl octadecyl ether,
3-mercaptopropyl octadecyl ether,
2-methyl-3-mercaptopropyl isobutyl ether,
6-mercaptohexyl eicosyl ether,
4-mercaptopentyl cyclohexyl ether,
4-mercaptobutyl phenyl ether,
3-mercaptocyclohexyl p-tolyl ether,
4-mercaptophenyl benzyl ether, mixtures thereof, and the like. Representative examples of the dihydrocarbyltin compounds which can be used to make the novel hydrocarbyltin derivatives of this invention include dimethyltin oxide, diethyltin dichloride, diisopropyltin oxide, dibutyltin oxide, dibutyltin dichloride, propylhexyltin oxide, dioctyltin oxide, dicyclohexyltin dichloride, diphenyltin dichloride, di-p-tolyltin oxide, dibenzyltin dichloride, mixtures thereof and the like.

Preferably, the reacton is conducted in the presence of an inert solvent, preferably an aromatic hydrocarbon such as toluene. Any suitable reaction temperature, e.g., about 10–200° C., preferably about 25–150° C., can be employed. When a dihydrocarbyltin oxide is employed, it is generally preferred to heat the mixture in an aromatic hydrocarbon at reflux temperature in order that water which forms during the reaction can be readily removed such as by azeotropic distillation. The reaction time can vary over a wide range, depending in part on the reaction temperature, but generally will be within the range of about 5 minutes to about 12 hours, preferably about 30 minutes to about 6 hours.

A feature of the method of preparing the compounds of the present invention is the use of inert organic solvents as the medium for the reaction, such as toluene, benzene, xylene, etc. The presence of such solvent facilitates the desired reaction. The solvent may be eliminated from the reaction product at the completion of the reaction by any suitable means. This can be accomplished by vaporizing the solvent under vacuum at elevated temperatures. Pressures of about 2 to about 30 mm. Hg and temperatures of 75–160° C. are satisfactory in effecting removal of toluene or like solvent, from the reaction product. By the procedures of this invention, these novel organotin derivatives of mercaptohydrocarbyl hydrocarbyl ethers can be obtained in almost theoretical yields. These yields are indicative of the non-necessity of the use of an excess of either reactant, the total amount of starting materials being substantially completely utilized in the formation of the final reaction product.

The hydrocarbyltin derivatives of the present invention are effective stabilizers for resins, particularly vinyl halide resins. As stabilizing agents for polymeric materials, particularly for vinyl halide resins, the compounds of this invention will normally be used in an amount in the range of about 0.01 to about 10, preferably about 1 to about 5, parts by weight of hydrocarbyltin derivative stabilizer per 100 parts by weight of resin. The production of vinyl halide resin compositions stabilized with the additives of the present invention can be carried out in various manners, readily apparent to those skilled in the art. For example, an intimate mixture of the vinyl halide polymer and stabilizing additive according to this invention, together with other known additives, if desired, can be achieved by mixing the various additives with the polymer in a conventional manner in an extrusion press or kneader. Since the incorporation of stabilizing additives in general with polymers is a technique well known in the art, the mode of mixing the ingredients constituting the stabilized vinyl halide polymer compositions of this invention is not considered a part of this disclosure.

It is understood that the stabilized vinyl halide polymer compositions of this invention can contain, in addition to the hydrocarbontyl stabilizing additives of this invention, other additives such as certain fillers, dyes, pigments, plasticizers, antioxidants, antistatic agents and the like. Such compounds are well known in the art and, for the sake of brevity, will not be repeated here.

The vinyl halide resins which can be stabilized with the hydrocarbyltin derivatives of this invention include homopolymers of vinyl chloride and copolymers of vinyl chloride with at least one monomer copolymerizable therewith. Typical polymers are poly(vinyl chloride), vinyl chloride-vinyl acetate copolymers, and the like.

The following examples will further illustrate the invention, although they are not to be construed as limiting the scope thereof.

EXAMPLE I

Preparation of dibutyltin bis[2-(octadecyloxy)ethyl mercaptide]

A mixture of 31.3 g. (0.125 mole) of dibutyltin oxide, 82.6 g. (0.25 mole) of 2-mercaptoethyl octadecyl ether, and 100 ml. of toluene was heated at 115–125° C. for 3 hours, during which time 2.5 ml. of water was removed by azeotropic distillation. The reaction mixture was heated with decolorizing charcoal and filtered, after which toluene was distilled from the filtrate under reduced pressure to give the desired dibutyltin bis[2-(octadecyloxy)ethylmercaptide] as a nearly colorless liquid residue weighing 109.9 g. with characterization by elemental analysis. Calculated for tin, 13.3 percent; sulfur, 7.2 percent. Found: tin, 13.8 percent; sulfur, 7.1 percent.

EXAMPLE II

A blend of 100 parts by weight commercial grade poly(vinyl chloride) resin, 50 parts by weight bis(2-ethylhexyl) phthalate plasticizer, 0.25 part by weight stearic acid lubricant, and 2 parts by weight dibutyltin bis[2-(octadecyloxy)ethyl mercaptide] as a stabilizer was milled on a roll mill at 320° F. for 5 minutes and then pressed at 340° F. into a 6″ x 6″ sheet. To determine heat stability of the composition, 2″ x ⅜″ specimens cut from the sheet were heated at a temperature of 177° C. (about 350° F.), and the specimens were evaluated by the method of ASTM D 2115–67. In these tests it was found that heating for 180 minutes was required to cause the composition to become black, the composition being only yellow after 20 minutes of heating. In contrast, in the absence of the stabilizer a blend of poly(vinyl chloride) resin, bis(2-ethylhexyl) phthalate plasticizer, and stearic acid lubricant in the ratios shown above would become brown during the milling process as conducted above, without any heating at the higher temperature of 177° C.

Reasonable variation and modification are possible within the foregoing disclosure without departing from the spirit or scope thereof.

I claim:

1. A composition of matter characterized by the formula

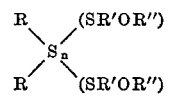

wherein each R is individually selected from the group consisting of monovalent hydrocarbon radicals containing from 1 to 8 carbon atoms; each R′ is individually selected from the group consisting of divalent hydrocarbon radicals containing from 2 to 6 carbon atoms; and each R″ is individually selected from the group consisting of monovalent hydrocarbon radicals containing from 2 to 20 carbon atoms.

2. A composition of matter according to claim 1 wherein said R radicals are the same, said R′ radicals are the same, and said R″ radicals are the same.

3. A composition of matter according to claim 2 wherein R is selected from the group consisting of alkyl, cycloalkyl, and aryl, and combinations thereof such as alkaryl and aralkyl, containing from 1 to 8 carbon atoms; R′ is selected from the group consisting of alkylene, cycloalkylene, and arylene radicals containing from 2 to 6 carbon atoms; and R″ is selected from the group consisting of alkyl, cycloalkyl, and aryl, and combinations thereof such as aralkyl and alkaryl, having from 2 to 20 carbon atoms.

4. A composition of matter according to claim 2 wherein R is an alkyl group having from 2 to 4 carbon atoms; R′ is an alkylene group containing 2 or 3 carbon atoms; and R″ is an alkyl group containing from 12 to 18 carbon atoms.

5. A composition of matter according to claim 4 wherein R is butyl, R′ is ethylene, and R″ is octadecyl.

References Cited

UNITED STATES PATENTS

| | | | |
|---|---|---|---|
| 3,525,761 | 8/1970 | Seki et al. | 260—429.7 |
| 3,631,082 | 12/1971 | Kino et al. | 260—429.7 |
| 3,646,081 | 2/1972 | Buchholz | 260—429.7 |

W. F. W. BELLAMY, Primary Examiner

U.S. Cl. X.R.

260—45.75 K